(12) United States Patent
Proust et al.

(10) Patent No.: US 6,367,014 B1
(45) Date of Patent: Apr. 2, 2002

(54) ENHANCED SHORT MESSAGE AND METHOD FOR SYNCHRONIZING AND ENSURING SECURITY OF ENHANCED SHORT MESSAGES EXCHANGED IN A CELLULAR RADIO COMMUNICATION SYSTEM

(75) Inventors: Philippe Proust, La Ciotat; Anne Laget, Aubagne; Cedric Huet, La Ciotat, all of (FR)

(73) Assignee: Gemplus S.C.A., Gemenos (FR)

( * ) Notice: Subject to any disclaimer, the term of this patent is extended or adjusted under 35 U.S.C. 154(b) by 0 days.

(21) Appl. No.: 09/214,409
(22) PCT Filed: Jul. 11, 1997
(86) PCT No.: PCT/FR97/01298
  § 371 Date: Jan. 12, 1999
  § 102(e) Date: Jan. 12, 1999
(87) PCT Pub. No.: WO98/03026
  PCT Pub. Date: Jan. 22, 1998

(30) Foreign Application Priority Data
Jul. 11, 1996 (FR) .............................................. 96 08906

(51) Int. Cl.[7] ................................................. G06F 11/30
(52) U.S. Cl. ........................ 713/182; 713/151; 713/162; 713/166; 380/247
(58) Field of Search ................................ 713/151, 162, 713/166, 168, 182; 380/247, 255

(56) References Cited
U.S. PATENT DOCUMENTS

| 4,654,480 A | 3/1987 | Weiss | |
| 5,457,734 A | * 10/1995 | Eryaman et al. | 455/422 |
| 5,467,398 A | * 11/1995 | Pierce et al. | 380/44 |
| 5,469,496 A | * 11/1995 | Emery et al. | 455/461 |
| 5,517,187 A | 5/1996 | Bruwer | |

FOREIGN PATENT DOCUMENTS

| EP | 0562890 | 9/1993 |
| EP | 0644513 | 3/1995 |
| EP | 0689368 | 12/1995 |
| WO | 9430023 | 12/1994 |

OTHER PUBLICATIONS

Gagnaire, Maurice "An Intelligent Hybrid . . . " IEEE 46th Vehicle Tech' Conference v.1. Apr. 28, 1996 p 277–281.

* cited by examiner

Primary Examiner—Thomas R. Peeso
(74) Attorney, Agent, or Firm—Roland Plottel

(57) ABSTRACT

The invention concerns a particular structure of enhanced short message, and a method for synchronizing and ensuring the security of exchanged enhanced short messages having this structure. Conventionally, an enhanced message is transmitted by a message service centre to a subscriber identification module (or SIM module) of a mobile station. The body (2) of this enhanced message contains in particular a first field (3) for remote commands pertaining to a remote application. This body (2) also contains a second field (4) for storing the current value of a synchronizing counter, to be compared to a previous value of the synchronizing counter, stored in the SIM module. The body (2) can contain another field (6) for storing a certificate, the body signature, for proving the authenticity of the enhanced message and the identity of its transmitter. The enhanced message is accepted or refused by the SIM module depending on the coherence of these values with the internal status of the SIM module.

20 Claims, 4 Drawing Sheets

ENHANCED SHORT MESSAGE AND METHOD FOR SYNCHRONIZING AND ENSURING SECURITY OF ENHANCED SHORT MESSAGES EXCHANGED IN A CELLULAR RADIO COMMUNICATION SYSTEM

The invention relates to messages exchanged in cellular radio communication systems. In general, these messages are exchanged between a message service center and a plurality of mobile stations. Each mobile station is composed of a terminal cooperating with a microprocessor user card called subscriber identity module (SIM).

More specifically, the invention relates to a particular enhanced message structure and a method for synchronizing and ensuring security when exchanging enhanced messages having this structure.

In the field of cellular radio communication, the GSM standard (global system for mobile public communications operating in the 900 MHz band) is known, primarily in Europe.

The invention applies, in particular, but not exclusively, to a system according to this GSM standard.

In general, a terminal is a piece of physical equipment used by a network user to access the telecommunications services offered. There are a number of different terminal types such as portables or even mobiles mounted on vehicles.

When a terminal is used by a user, the latter must connect his user card (SIM module), which is generally in the form of a smart card, to the terminal.

The user card supports a principal telephone application (for example the GSM application) which allows it, as well as the terminal to which it is connected in the cellular communications system, to operate. In particular, the user card provides the terminal with which it is connected with a unique subscriber identifier (or IMSI identifier, standing for "International Mobile Subscriber Identity"). For this purpose, the user card includes command execution means (for example a microprocessor and a program memory) and data storage means (for example a data storage).

The IMSI identifier, and all the individual information about the subscriber, to be used by the terminal, are stored in the data storage means of the SIM module. This enables each terminal to be used with any SIM module.

In certain known systems, particularly in a GSM system, there is a short message service (SMS) for sending short messages to mobile stations. These messages are transmitted by a short message service center (SMS-C).

When a mobile station receives a short message, it stores it in the data storage means of its SIM module. The principal telephone application of each SIM module handles each short message received.

Originally, the only function of a message was to provide information to the subscriber, generally via a terminal display screen. Messages that have this single function, known as short messages, thus contain only raw data.

Subsequently, an enhanced short message system (ESMS) was designed in which two types of short messages could be sent, namely the normal messages referred to above and enhanced messages which could contain commands.

Thus, the proposal has already been made that commands for updating or reconfiguring this SIM module remotely be transmitted to an SIM module via enhanced messages. In other words, commands encapsulated in enhanced messages enable the main telephone application of the SIM module to be modified. In this way, the SIM module can be reconfigured without having to bring it to a point of sale (and hence the SIM module can execute administrative commands when it is in the application phase).

It has also been proposed that the SIM module serve as a support for applications other than the principal telephone application such as in particular vehicle renting, payment, or loyalty applications.

Since the commands belonging to these other applications are contained in enhanced messages, which are thus external to the SIM module, these other applications are known as remote or OTA ("Over The Air"). On the other hand, the principal telephone application, whose commands are contained in the SIM module data storage means, is known as "local." The commands are also known as "local" or "remote" depending on whether the application to which they belong is itself local or remote.

Hence, remote applications (renting, payment, reconfiguration of principal telephone application, etc.) can be executed with these remote commands.

It is clear that this recent remote application (or OTA application) concept is highly advantageous for the subscriber. The latter is able to carry out numerous applications such as renting a vehicle or paying for a service very easily simply by inserting his SIM module into a terminal.

In other words, the SIM module is made to do something different (essentially, more commands) that what it is normally able to do once it is in its application phase, namely once it is inserted into a cellular telephone in the user's hand.

This enhanced working capacity of the SIM module entails particular security requirements. This mechanism, which is in fact an additional gateway into the SIM module, should prevent any person from carrying out actions in the SIM module from which he is normally prohibited.

Resynchronization, uniqueness of each message, integrity of each message, and authenticity of the transmitting entity are some of the particular security requirements linked to the utilization of enhanced messages.

This is because it is important to be able to resynchronize the message source and the SIM module if there are transmission problems on the network. Due to transmission problems in the enhanced message channel, neither the path of an enhanced message nor the transmission sequence of several enhanced messages can be guaranteed.

The requirement that each message be unique avoids replaying a message either accidentally (indeed, the path followed by an enhanced message is such that a given message could be transmitted several times to an SIM module) or intentionally (i.e. fraudulently with the idea of having the SIM module execute the same command sequence, such as the commands enabling a prepaid telephone unit meter in the SIM module to be recredited, several times in succession).

The requirement of integrity of each message prevents a message from being corrupted either accidentally (also due to the transmission path between the message service center and the mobile station) or intentionally (with the idea of modifying a message and forcing it to carry out other actions more sensitive than those planned by the message source).

The requirement that the transmitting entity be authentic ensures that it is indeed authorized to send enhanced messages. This remote application mechanism must be reserved for particular transmitters (such as operators and suppliers of services).

The recent remote application concept as currently implemented proves not to meet all these particular security requirements.

The only proposal made to date has been to introduce a checksum into each enhanced message and run a check procedure in which a secret code is presented before remote commands contained in the enhanced message are executed.

Clearly, this solution is incomplete and thus unsatisfactory.

First of all, the use of a checksum, which is a relatively basic solution, only ensures that the transmission has been carried out correctly.

Also, procedures of the secret code checking type do not offer sufficient security guarantees if an enhanced message is intercepted. Since the identifier information does not vary from one message to another, it is easy for an unauthorized person to replay a message, and pass off a fraudulently intercepted message as authentic.

Finally, this known solution does not meet the other requirements listed above, namely resynchronization and integrity of the messages.

The goal of the invention is to overcome these drawbacks of the prior art.

More specifically, one of the goals of the present invention is to provide a method for synchronizing and ensuring security of an exchange of enhanced messages and a corresponding enhanced message structure enabling the message source and the SIM module to be resynchronized if there are transmission problems on the network.

Another goal of the invention is to provide such a method and such an enhanced message structure ensuring uniqueness of each enhanced message transmitted.

Another goal of the invention is to provide such a method and such an enhanced message structure that ensure the integrity of each enhanced message transmitted.

A supplementary goal of the invention is to provide such a method and such an enhanced message structure that ensure the authenticity of the entity transmitting the enhanced messages.

These goals, and others which will emerge hereinbelow, are achieved according to the invention with the aid of an enhanced message of the type transmitted by a message service center to a mobile station of a cellular radio communication system, the enhanced message including a header and a body, the body containing in particular a first field storing remote commands belonging to an application remote from the mobile station, the mobile station constituting a terminal cooperating with a subscriber identification module, the terminal including means for receiving the enhanced message, the subscriber identification module including means for storing and processing the enhanced message received by the terminal, the subscriber identification module serving to support the remote application and including means for executing the remote commands, the enhanced message being characterized in that the body also includes a second field (4) for storing the current value of a synchronization counter, the current value of the synchronization counter being intended to be compared to a previous value of the synchronization counter stored in the subscriber identification module so that the enhanced message is accepted or rejected by the subscriber identification module depending on the result of comparing the current value with the previous value of the synchronization counter, the previous value being updated with the current value only once the enhanced message has been accepted by the subscriber identification module.

Thus, synchronization between the message service center and the subscriber identification module (or SIM module) is based on the use of a computer shared by these two entities. Each message transmitted to the SIM module contains the current value of this synchronization counter. This current value is unique for each message. The SIM module retains the previous synchronization counter value, which it compares to the current value contained in each message in order to accept or reject this message.

If there is a problem when the message is transmitted, the SIM module can resynchronize with the message source when the next message is sent because the current synchronization counter value is contained in each message.

If the SIM module supports several remote applications, each of them can be associated with a separate synchronization counter, in which case the SIM module stores the previous values of the various counters.

Advantageously, the body of the enhanced message also includes a third field storing a first piece of information pinpointing the location of the previous synchronization counter value in the subscriber identification module data storage means.

This is particularly useful where the SIM module supports several remote applications. In these cases, when it receives a message, it is the content of the third field that tells the SIM module which synchronization counter to use.

In a preferred embodiment of the invention, wherein the subscriber identification module data storage means have a hierarchical structure with at least three levels including at least the following three types of files:

master file;

dedicated file or secondary file placed under the master file, elementary file placed under one of the dedicated files, known as parent dedicated file, or directly under the master file, known as parent master file, an elementary system file (EF SMS System) specific to each remote application containing a second piece of information pinpointing the location of the previous synchronization counter value in the subscriber identification module data storage means, the enhanced message is characterized in that the first piece of locating information contained in the third storage field is an identifier of a dedicated file or master file to which the elementary system file relates according to a predetermined search strategy in the data storage means.

Thus, each message includes an identifier enabling the SIM module to find the elementary system file with which the remote application transmitting this message is linked. This elementary system file also includes the previous synchronization counter value associated with this message-transmitting remote application.

Preferably, the body also includes a fourth field (6) storing a cryptogram, known as transmitted cryptogram, calculation of which at least partially involves the content of the second field stored the current synchronization counter value, the transmitted cryptogram being intended to be compared with another cryptogram, known as local cryptogram, calculated by the subscriber identification module so that the enhanced message is accepted by the subscriber identification module if the transmitted and local cryptograms are identical, and rejected if they are not.

In other words, the use of a synchronization counter and a cryptogram is combined. This greatly enhances the security of message exchanges between the message service center and the SIM module.

The use of a cryptogram enables the SIM module to ensure that the transmitter of a message is indeed an authorized source (one speaks also of transmitter entity authenticity) and ensures the integrity of the message.

Moreover, synergy exists between the use of the synchronization counter and that of the cryptogram since calculation of the latter involves the current counter value.

First, since the current counter value is different for each message, the same message cannot be fraudulently replayed. In other words, the uniqueness of each message is ensured.

Also, since the current counter value is contained in the message, the SIM module knows which current value has been used to calculate the cryptogram and can thus calculate the comparison cryptogram (local cryptogram) on the same basis.

Finally, transmitting the current counter value in the message also ensures that a received message can be accepted even if the message or messages transmitted prior to it have not been received (or never arrived).

Advantageously, calculation of the transmitted and verification cryptograms also involves, at least partially, the content of the first field storing the remote commands.

In one advantageous embodiment of the invention, calculation of the transmitted and verification cryptograms involves at least the entire content of the second field storing the current synchronization counter value and the entire content of the first field storing the remote commands. This ensures the quality of the security process.

Preferably, the transmitted and verification cryptograms are calculated with a cryptographic function belonging to the group including:
  the secret key cryptographic functions; and
  the public key cryptographic functions.

Thus, the invention is not confined to the use of a particular type of cryptographic function.

Preferably, the subscriber identification module stores, in the subscriber identification module data storage means, a cryptographic function and an associated key which are specific to the remote application and enable the local cryptogram to be calculated,
  the enhanced message is characterized in that the body of the enhanced message also includes a fifth field storing a third piece of information pinpointing the location in the data storage means where the cryptographic function and the associated key specific to the remote application are stored.

This is particularly useful in the case where the SIM module supports several remote applications, each associated with a different pair (cryptographic function/key) and where the SIM module stores the various pairs associated with these applications. In this case, when it receives a message, it is the content of the fifth field that tells the SIM module which pair (cryptographic function/key) to be used.

In a preferred embodiment of the invention, the third field also constitutes the fifth field, and the first piece of locating information also constitutes the third piece of locating information.

Thus, the content of the third field tells the SIM module not only which synchronization counter to use but also which pair (cryptographic function/key).

Advantageously, the body also includes a sixth field storing a checksum, known as transmitted checksum, calculation of which involves, at least in part, the contents of the first field storing remote commands,
  the transmitted checksum being intended for comparison with another checksum known as local checksum, calculated by the subscriber identification module, so that the enhanced message is accepted by the subscriber identification module if the transmitted checksum and the local checksum are identical, and rejected if they are not.

This use of a checksum constitutes an additional security level. It enables a message that was modified accidentally for example to be rapidly rejected without cryptographic calculations having to be done.

Moreover, if the possibility of decoupling the cryptogram check from the counter check under certain conditions is provided, the "checksum" field will, but with a very relative level of guarantee, itself ensure that the message has not been accidentally or intentionally corrupted. However it is clear that this possibility must be reserved for configurations where the logical security linked to remote applications limits the actions possible in the SIM module.

Advantageously, the subscriber identification module includes an input/output line over which it receives local commands belonging to an application local to the mobile station,
  the enhanced message is characterized in that the remote commands contained in the first field of the enhanced message are substantially identical to the local commands received over the input/output line.

In this way, the SIM module can handle both types of commands, local and remote, without it being necessary to duplicate the executable code of the SIM module (this code is generally in the ROM or EEPROM).

The invention also relates to a method for synchronizing and ensuring security of enhanced messages exchanged between a message service center and a mobile station of a cellular radio communication system, each enhanced message including a header and a body, the body containing in particular a first field for storing remote commands belonging to a remote application of the mobile station,
  the mobile station constituting a terminal cooperating with a subscriber identification module, the terminal including means for receiving the enhanced message, the subscriber identification module including means for storing and processing the enhanced message received by the terminal, the subscriber identification module serving to support the remote application and including means for executing the remote commands,
  the method being characterized by having in particular the following steps:
    the message service center transmits to the mobile station an enhanced message whose body also includes a second field in which the current value of a synchronization counter is stored;
    the subscriber identification module of the mobile station compares the current synchronization counter value contained in the enhanced message with a previous synchronization counter value stored in the subscriber identification module;
    the subscriber identification module accepts or rejects the enhanced message depending on the result of comparing the current with the previous synchronization counter values;
    if the enhanced message has been accepted, the subscriber identification module updates the previous value with the current value.

Preferably, for each new enhanced message of the remote application transmitted by the message service center, the current synchronization counter value is incremented by a predetermined step,
  and the enhanced message is accepted by the subscriber identification module only if the current synchronization counter value is higher than the previous value.

In other words, to prevent a message from being replayed, any new current value must be higher than that contained in the last accepted message (i.e. the previous value stored in the SIM module).

Preferably, the step in which the previous synchronization counter value is updated with the current value is carried out only if the difference between the current and previous values is less than a maximum predetermined increment.

Thus, the counter is prevented from being locked at its maximum value too rapidly. This increases the service life of the counter and prevents the type of attack in which the SIM module is quickly locked by bringing the counter to its maximum value. When it is locked in this way, the counter cannot be reset to zero by a remote application. It can be unlocked only by an administrative procedure which generates additional cost.

Advantageously, the method also includes the following step:

when the enhanced message is rejected by the subscriber identification module, the latter sends back to the message service center an enhanced message containing a specific error code telling the message service that the enhanced message that it previously transmitted was rejected due to a counter synchronization problem.

This is particularly the case when two successive messages, for example with the current counter values N and N+1 respectively, are not received in the order they were sent. If the first message received is accepted, the second message is rejected (as explained below) and the transmitting entity can advantageously be informed of the reason for rejection, namely a synchronization problem.

It will be understood that when the SIM module receives the first message (value N+1), the previous value that it stores is N−1. Hence the current value of the first message, equal to N+1, is greater than this value N−1. The previous value is then updated with the current value of the first message received, and when the SIM module receives the second message, the previous value it stored is hence N+1. Thus, the current value of the second message, equal to N, is less than this previous value, N+1, justifying rejection of this second message due to a synchronization problem.

Advantageously, the body of the enhanced message transmitted by the message service center to the mobile station also includes a third field storing a first piece of information pinpointing the storage location, in the subscriber identification module data storage means, of the previous synchronization counter value, the comparison step by the subscriber identification module of the current and previous synchronization counter values is preceded by the following steps:
the subscriber identification module reads the first piece of locating information contained in the third field of the enhanced message;
the subscriber identification module deduces therefrom the storage location of the previous synchronization counter value;
the subscriber identification module reads, in the storage location, the previous synchronization counter value.

In a preferred embodiment of the invention, the body of the enhanced message transmitted by the message service center to the mobile station also includes a fourth field storing a cryptogram, known as transmitted cryptogram, calculated using at least part of the contents of the second field storing the current synchronization counter value, and the method also includes the following steps:
the subscriber identification module calculates a local cryptogram, using at least in part the contents of the second field of the enhanced message;
the subscriber identification module compares the transmitted cryptogram to the local cryptogram so that the enhanced message is accepted if the transmitted and local cryptograms are identical and rejected if they are not.

Advantageously, the subscriber identification module stores, in the subscriber identification module data storage means, a cryptographic function and an associated key that are specific to the remote application enabling the local cryptogram to be calculated, the method is characterized in that the body of the enhanced message transmitted by the message service center to the mobile station also includes a fifth field storing a third piece of information pinpointing the storage location, in the data storage means, of the cryptographic function and the associated key,
and in that the step in which the subscriber identification module calculates the local cryptogram has the following steps:
the subscriber identification module reads the third piece of locating information contained in the fifth field of the enhanced message;
the subscriber identification module deduces from this the storage location of the cryptographic function and the associated key;
the subscriber identification module calculates the local cryptogram, using the cryptographic function, the associated key, and at least part of the contents of the second field of the enhanced message.

In a preferred embodiment of the invention wherein the subscriber identification module data storage means possess a hierarchical structure with at least three levels having at least the following three types of files:
master file;
dedicated file, or secondary file placed under the master file,
elementary file placed under one of the dedicated files, known as parent dedicated file, or directly under the master file, known as parent master file,
the method being characterized in that an elementary system file (EF SMS System) specific to each remote application, contains a second piece of information pinpointing the location, in the subscriber identification module data storage means, of the previous synchronization counter value, of the cryptographic function, and of the associated key,
and in that the third field also constitutes the fifth field with the first piece of locating information also constituting the third piece of locating information,
and in that the first piece of locating information contained in the third storage field is an identifier of a dedicated file (DF) or master file (MF) to which the elementary system file (EF SMS System) relates according to a predetermined search strategy in the data storage means.

Advantageously, the body of the enhanced message transmitted by the message service center to the mobile station also includes a sixth field storing a checksum, known as transmitted checksum, calculation of which involves at least in part the contents of the first field storing remote commands, with the process also including the following steps:
the subscriber identification module calculates a local checksum, using at least in part the contents of the first field of the enhanced message,
the subscriber identification module compares the transmitted checksum to the local checksum so that the enhanced message is accepted if the transmitted and local checksums are identical and rejected if they are not.

Other characteristics and advantages of the invention will emerge from reading the following description of one preferred embodiment of the invention provided as a nonlimiting indicative example, and the attached drawings, wherein.

The invention thus relates to a particular enhanced message structure and a method for synchronizing and ensuring the security of the exchange of enhanced messages with this structure, In the particular embodiment described below, solely as a nonlimiting indicative example, the cellular radio communication system is of the GSM type and uses an enhanced short message center (ESMS).

It is clear however that the invention is not limited to a GSM type system but relates in general to all cellular radio communication systems offering enhanced message service.

Classically, in the case of the GSM, the enhanced short messages are exchanged between a short message service center (SMS-C) and one or more of a plurality of mobile stations (MS). Each mobile station constitutes a terminal cooperating with a subscriber identification module (SIM module). The terminal has means for receiving an enhanced message. The SIM module has means for storing and processing the enhanced message received by the terminal. Each enhanced message contains remote commands belonging to a remote application of the SIM module. The SIM module supports this remote application (and possibly others) and includes means of executing these remote commands.

Figure 1:
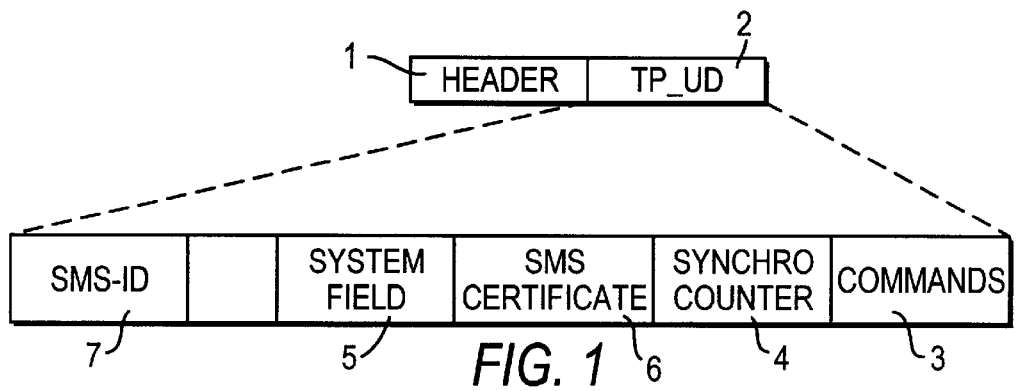
FIG. 1 is a particular embodiment of the structure of an enhanced message according to the invention.

FIG. 1 shows a particular embodiment of the structure of an enhanced message according to the invention.

Classically, the enhanced message has a header 1 and body 2 (or TP-UD standing for "Transfer Layer Protocol_ User Data"). Body 2 has in particular a "Command" field 3 in which the remote commands are stored.

According to the invention, these are for example classical commands (operational or administrative) defined in standards GSM 11.11, ISO 78.16-4, or EN 726-3, such as SELECT, UPDATE BINARY, UPDATE RECORD, SEEK, CREATE FILE, CREATE RECORD, EXTEND, etc. In other words, the format of these remote commands is identical to that of the local commands the SIM module normally receives over its input/output line. Hence the SIM module can handle remote commands in the same way as local commands.

In the particular embodiment shown in FIG. 1, body 2 of the enhanced message of the invention has several other fields, namely in particular a "Synchronization Counter" field 4, a "System" field 5, an "SMS Certificate" 6, and an "SMS-ID" field 7.

The content of each of the other fields 4 to 7 of body 2 of the enhanced message will now be presented in detail.

The "Synchronization Counter" field 4 contains the current value of a synchronization counter. As explained more precisely below in relation to FIGS. 2 to 4, 6, and 8, this current synchronization counter value is intended to be compared with a previous value of this same synchronization counter, stored in the data storage means of the SIM module. Depending on the result of this comparison, the enhanced message is either accepted or rejected by the SIM module.

The "System" field 5 contains information on the location, in the SIM module data storage means, of a system file itself containing either elements pertinent to the message-sending remote application, or other information for locating these elements in the SIM module data storage means.

"Elements pertinent to the sending remote application" are understood in particular to be the previous synchronization counter value as well as a cryptographic function and its associated key (the latter two elements enable a "local" cryptogram to be calculated, which is to be compared to a "transmitted" cryptogram contained in the "SMS Certificate" field 6).

It is known that a hierarchical structure with at least three levels can be provided for the SIM module data storage means, with the following three types of files:

master file (MF);

dedicated file (DF), or secondary file placed under the master file, elementary file (EF) placed under one of the dedicated files, known as parent dedicated file, or directly under the master file, known as parent master file.

In the case of such a hierarchical structure, the aforesaid system file of the invention is for example an elementary system file (EF SMS System). The locating information contained in "System" field 5 is then an identifier ("DF input") of a dedicated file (DF) or a master file (MF) to which the elementary system file (EF SMS System) relates according to a search strategy predetermined in the data storage means.

The SIM module uses for example a backtracking search mechanism, namely:

looking first in an elementary system file under the current dedicated file or master file (namely the file indicated by the "DF input" identifier), then, if no elementary system file exists under the current dedicated file or master file and if the "DF input" identifier does not indicate the master file, looking for an elementary system file directly under the master file.

Thus, the SIM module reads in the enhanced message the "DF input" identifier contained in the "System" field 5. From this "DF input" identifier, it finds the elementary system file to which the remote application sending the message is linked. In this elementary system file, the SIM module reads for example:

the current synchronization counter value, directly; and the identifier of a dedicated file in which a key_op EF file containing the pair (cryptographic function, associated key) linked to the message-sending remote application is found.

The "SMS Certificate" field 5 contains a cryptogram (called "transmitted cryptogram" hereinbelow). As explained more precisely below, in relation to FIGS. 6 and 9, this transmitted cryptogram is intended to be compared to a local cryptogram, which in its turn is calculated by the SIM module. Depending on the result of this comparison, the enhanced message is either accepted or rejected by the SIM module.

A particular embodiment of calculating the transmitted cryptogram SMS-Cert will now be presented (this calculation is of course identical to that of the local cryptogram). We have the following relationship:

SMS-Cert=4 least significant octets of [MAC__Alg$_{algo\_id}$ (K$_{appli}$, SMS__data)] where "Alg$_{algo\_id}$" is the algorithm associated with the remote application (the elementary system file (EF SYS System) makes it possible to locate this algorithm, on which this remote application depends);

K$_{appli}$ is the secret (or public) key associated with the algorithm Alg$_{algo\_id}$;

"SMS__data"=Sync 1 Message (application), where:
"1" symbolizes the concatenation operator;
"Sync" is the value (current, for calculating the transmitted cryptogram) of the synchronization counter;
"Application Message" is the content of the "Commands" field 3 (in which the remote command are stored);

MAC__Alg$_{algo\_id}$ is a function based on the Alg$_{algo\_id}$ algorithm, which makes a calculation of the "MAC" (Message Authentication Code) type on the SMS__data concatenation using the K$_{appli}$ key.

Figure 5:
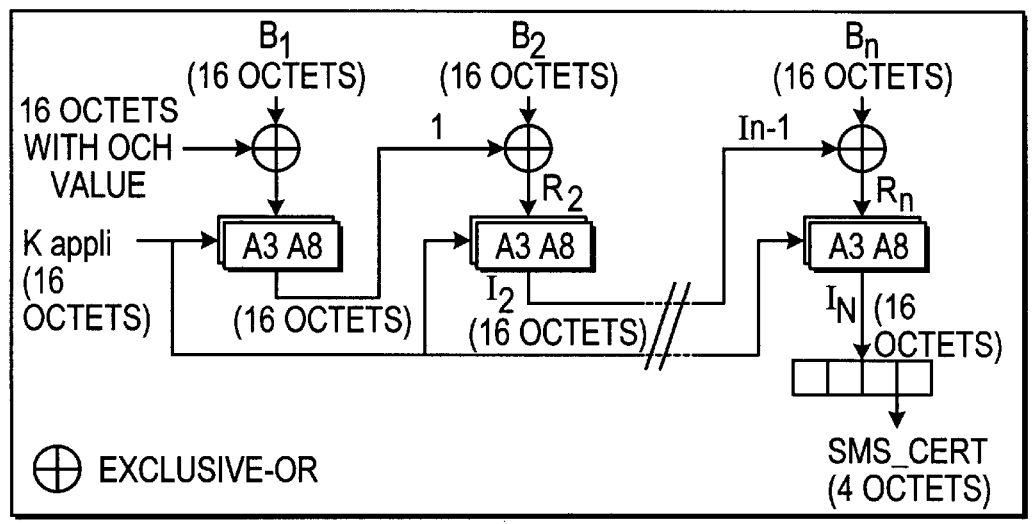
FIG. 5 is an example of calculating a cryptogram used in the method of the invention.

FIG. 5 is an example of calculating the SMS-Cert cryptogram transmitted in the case where the Alg$_{algo\_id}$ algorithm is MoU A3A8. Clearly, algorithm A3A8 is only one implementation example and other algorithms can be used. Of course, a more general implementation would be to specify the algorithm to be used (by means of an algorithm identifier) for a particular application.

The SMS__data concatenation is divided into n blocks $B_1$, $B_2$, ..., $B_{n-1}$, $B_n$ with $n \leq 9$. Blocks $B_1$ through $B_n$ have for example 16 octets. If the length of the SMS data concatenation does not enable a last block $B_n$ having 16 octets to be obtained, the last block is left-justified and completed to the right with octets with value 0 to build a block having 16 octets called $B'_n$. These blocks are involved in the following calculations:

$I_1$=A3A8 (K$_{appli}$, $B_1$)
$R_2$=XOR ($I_1$, $B_2$)
$I_2$=A3A8 (K$_{appli}$, $R_2$)
...
$R_{n-1}$=XOR ($I_{n-2}$, $B_{n-1}$)
$I_{n-1}$=A3A8 (K$_{appli}$, $R_{n-1}$)
$R_n$=XOR ($I_{n-1}$, $B'_n$)
$I_n$=A3A8 (K$_{appli}$, $R_n$)

$I_n$ is the result of the function MAC__A3A8. XOR is the operator creating a bit-by-bit "exclusive-OR" between two chains of 16 octets.

The "SMS-ID" field 7 contains a checksum (called "transmitted checksum" hereinbelow). As explained more precisely below in relation to FIGS. 6 and 7, this transmitted checksum is to be compared to a local checksum which is calculated by the SIM module. Depending on the result of this comparison, the enhanced message is either accepted or rejected by the SIM module.

A particular example of calculating the transmitted checksum SMS__ID will now be presented (this calculation is of course identical to that of the local checksum. We have the relationship: SMS__ID=NO (Σ octets of "Commands" field 3).

Figure 6:
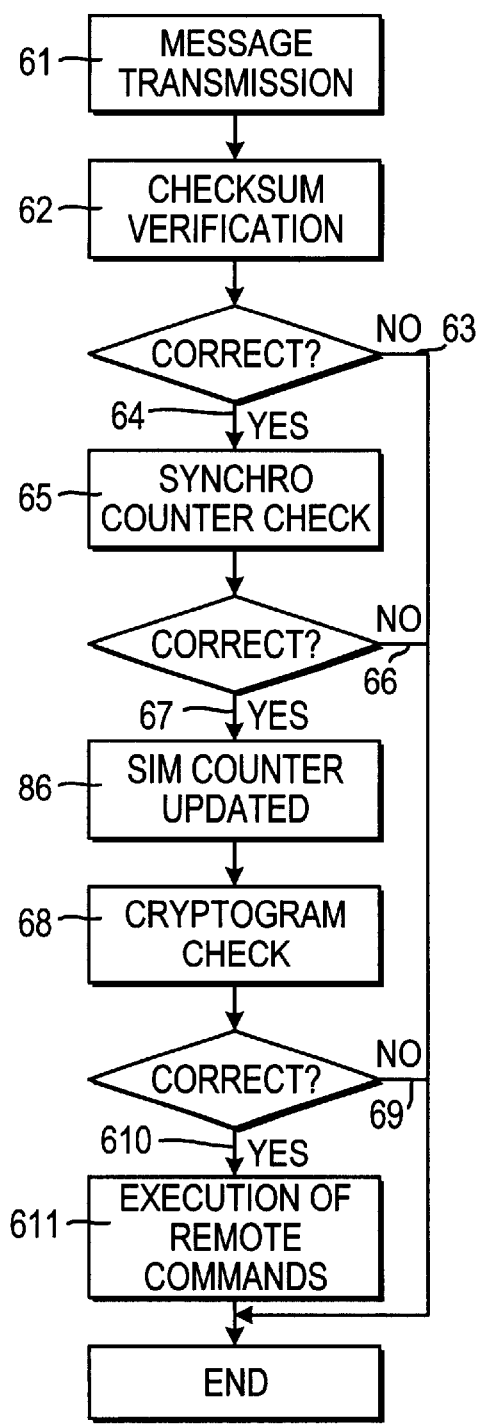
FIG. 6 is a simplified flowchart of a particular embodiment of the method of the invention, and FIGS. 7 to 9 each show one of the stages in the chart of FIG. 6, in greater detail.

FIG. 6 is a simplified flowchart of a particular embodiment of the method of the invention for synchronizing and ensuring security of exchanged enhanced messages having the structure in FIG. 1.

In this particular embodiment, the method according to the invention has the following steps in particular:

The message service center transmits (61) an enhanced message to the SIM module of the mobile station;

The SIM module checks (62) the transmitted checksum contained in the "SMS-ID" field 7 of the enhanced message;

If (63) the result of checking the transmitted checksum is incorrect, the enhanced message is rejected by the SIM module; if not (64), the SIM module checks (65) the current synchronization counter value, contained in the "Synchronization Counter" field 4;

If (62) the result of checking the current synchronization counter value is incorrect, the enhanced message is rejected by the SIM module; if not (67), the SIM module immediately updates the preceding counter value with the current value before any further checks are done. It then checks (68) the transmitted cryptogram which is contained in the "SMS Certificate" field 6;

If (69) the result of checking the transmitted cryptogram is incorrect, the enhanced message is refused by the SIM module and if not (610), the SIM module executes (611) the remote commands contained in the "Commands" field 3.

Figure 7:
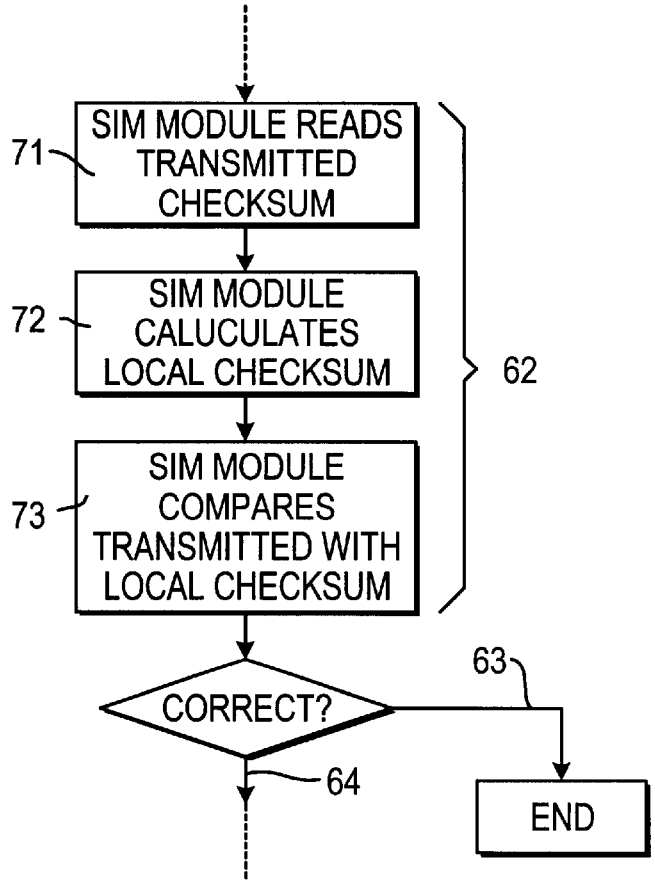

As shown in greater detail in FIG. 7, step (62) of checking the transmitted checksum itself includes the following steps:

The SIM module reads (71) the transmitted checksum in the "SMS-ID" field 7 of the enhanced message;

The SIM module calculates (72) a local checksum according to the same calculation rule used to calculate the transmitted checksum;

The SIM module compares (73) the transmitted checksum with the local checksum.

Thus, at this first checking level, the enhanced message is accepted (64) if the transmitted and local checksums are identical and rejected (63) if they are not.

Figure 8:
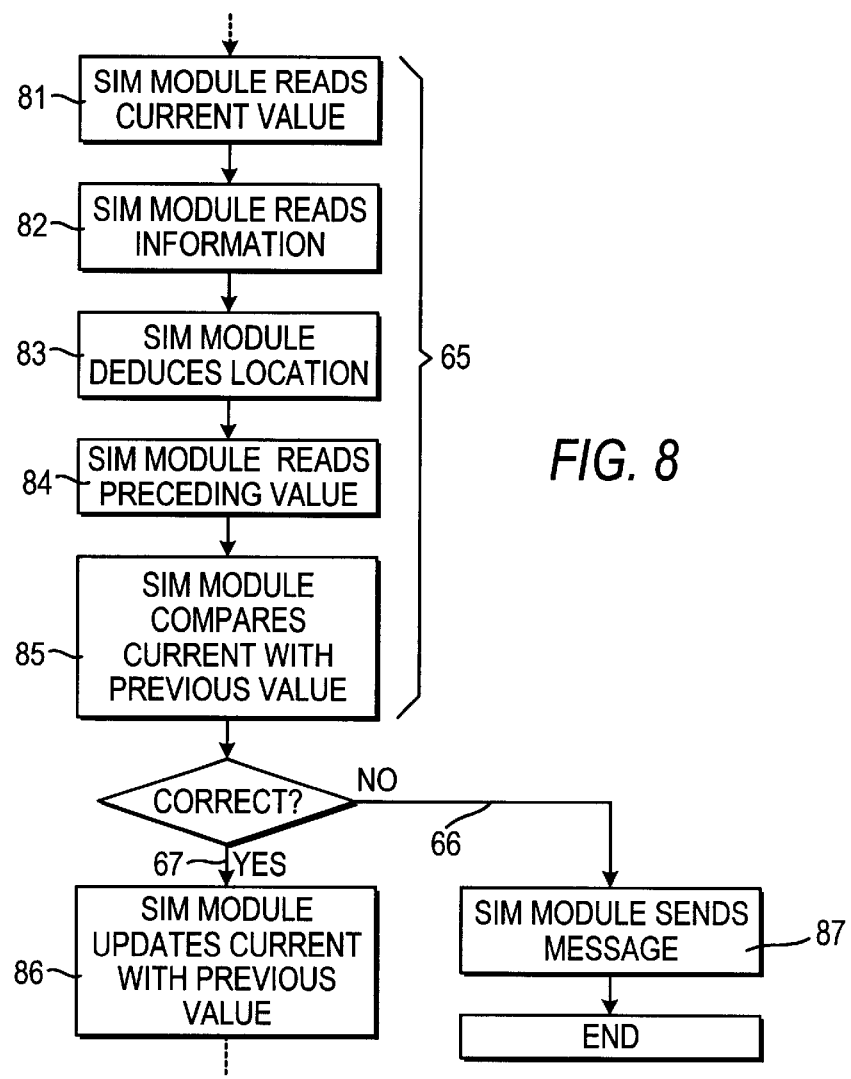

As shown in greater detail in FIG. 8, the step (65) in which the current synchronization counter value is checked itself contains the following steps:

The SIM module reads (81) in the "Synchronization Counter" field 4, the current value of the synchronization counter;

The SIM module reads (82) in the "System" field 5 of the enhanced message, information locating a system file (EF SMS System). As already explained above, this locating information is for example the "DF input" identifier of a dedicated file (DF) or a master file (MF) to which this elementary system file (EF SMS System) relates;

From this, the SIM module deduces (83) the location, in the SIM module data storage means, of the system file (EF SMS System) containing in particular the previous synchronization counter value;

The SIM module reads (84), in the system file (EF SMS System), the preceding value of the synchronization counter;

The SIM module compares (85) the current synchronization counter value with the previous value stored in the SIM module;

At this second checking level, the enhanced message is accepted by the SIM module if (67) the current value is definitely higher than the preceding synchronization counter value. The SIM module can then update (86) the previous value with the current value;

If (66) the current value is less than or equal to the previous synchronization counter value, the enhanced message is rejected by the SIM module. The SIM module can then send (87) an enhanced message containing a specific error code back to the message service center telling the message service center that the enhanced message it sent previously was rejected due to a counter synchronization problem.

One can for example decide that for each new enhanced message transmitted by the message service center, the current synchronization counter value will be incremented by a predetermined step (equal to 1 for example). An enhanced message is then only accepted by the SIM module if the current synchronization counter value containing this enhanced message is greater than the previous value stored by the SIM module.

One can also arrange for step 86, in which the previous synchronization counter value is updated with the current value, to be effected only if the difference between the synchronization counter current and previous values is less than a maximum predetermined incrementation.

Figure 2:
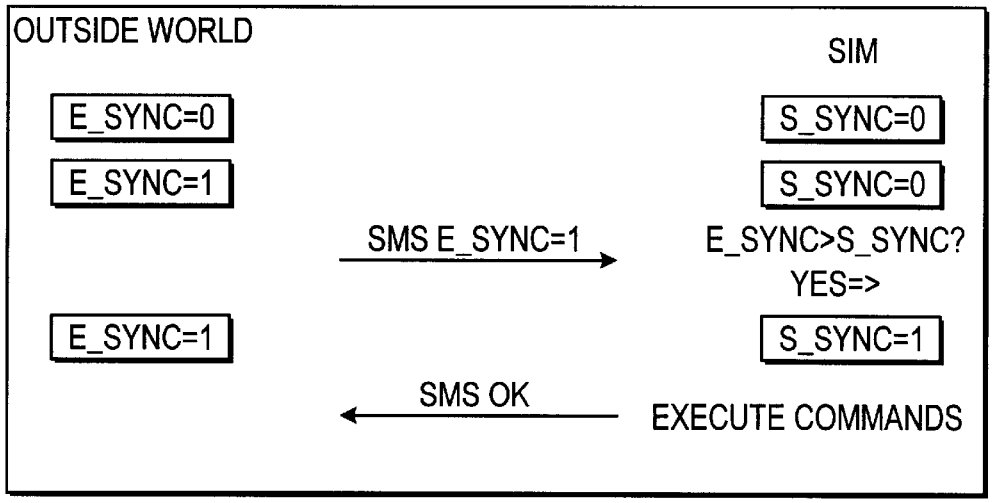
FIGS. 2 to 4 are examples of exchanges of enhanced messages secured by the method of the invention.
Figure 3:
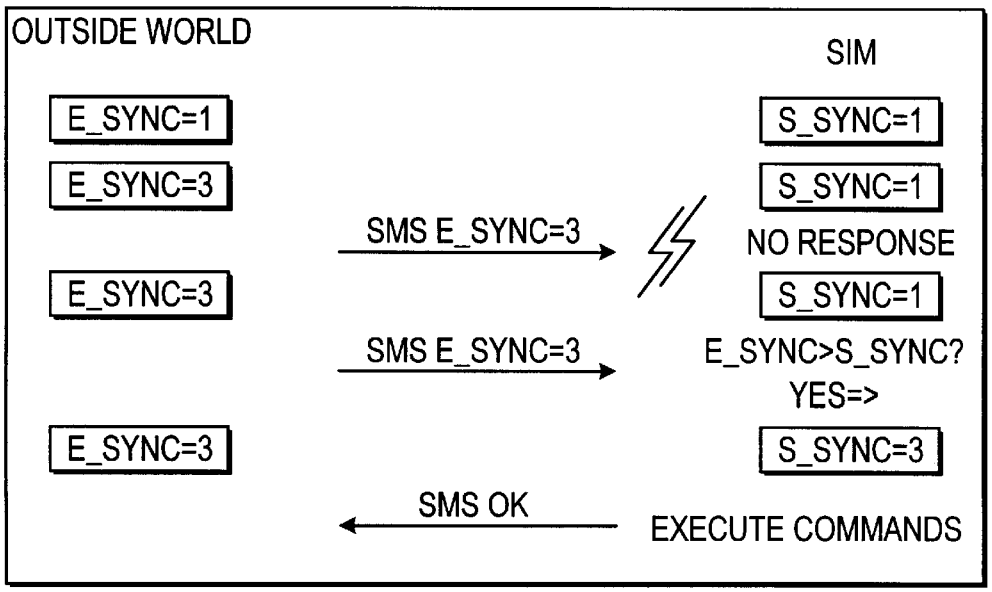
Figure 4:
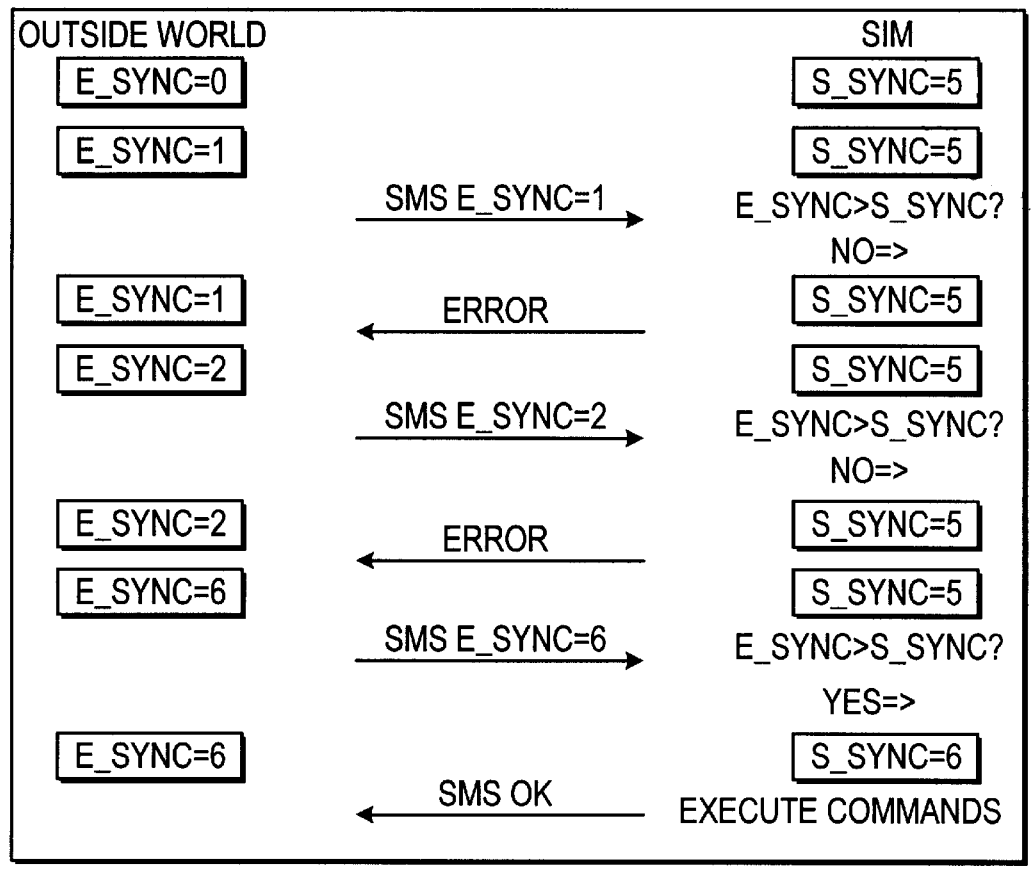

FIGS. 2 to 4 show various examples of secured enhanced message exchanges according to the method of the invention. In each figure, the change from the current counter value, called E_Sync (in the "outside world," on the left) and that of the stored value, called S_Sync (in the SIM module, on the right) is represented. Each arrow represents one message.

In the first case (FIG. 2), synchronization and transmission of the enhanced message are correct. We have: E_Sync (=1)>S_Sync (=0). The previous value is updated to 1 and the remote commands are executed.

In the second case (FIG. 3), there is a problem when transmitting the enhanced message. The SIM module does not respond. On the other hand, the second transmission attempt takes place smoothly. Finally, we have: E_Sync (=3)>S_Sync (=1). The previous value is updated to 3 and the remote commands are executed.

In the third case (FIG. 4), there is a synchronization problem at the outset. We have: E_Sync (=1)<S_Sync (=5). Several enhanced messages including current values incremented successively are sent until the message service center is once again synchronized with the SIM module. This is the case when we have: E_Sync (=6)>S_Sync (=5). The previous value can then be updated to 6 and the remote commands are executed.

Figure 9:
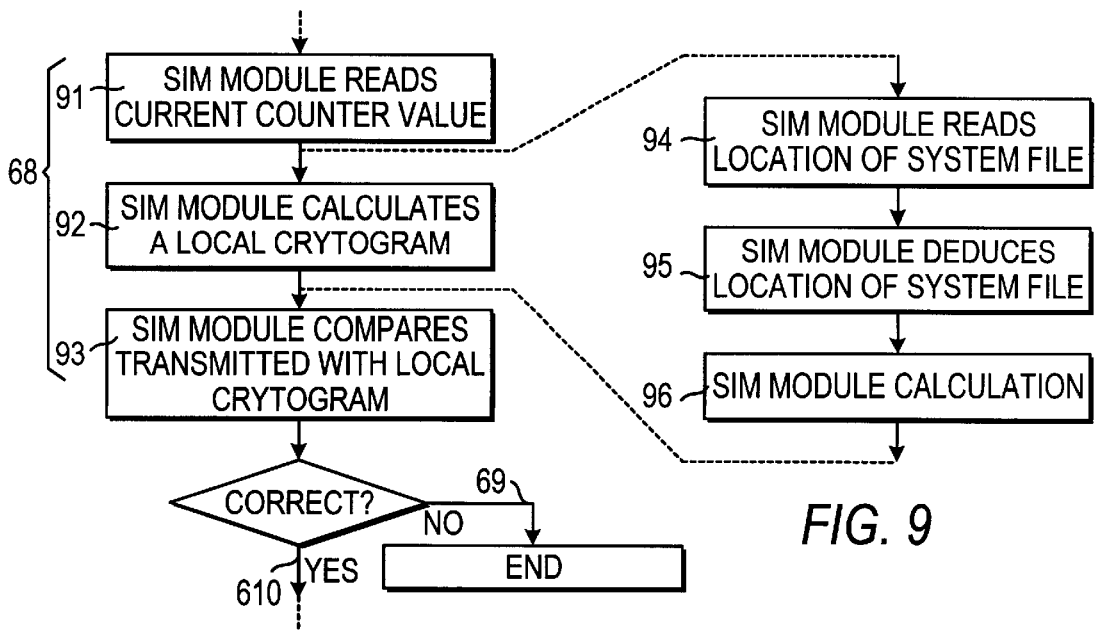

As shown in greater detail in FIG. 9, step (68) in which the transmitted cryptogram is checked itself has the following steps:

The SIM module reads (91), in the "SMS Certificate" field 6, the current synchronization counter value;

The SIM module calculates (92) a local cryptogram using the same calculation rule used to calculate the transmitted cryptogram;

The SIM module compares (93) the transmitted cryptogram with the local cryptogram.

Thus, at this third checking level, the enhanced message is accepted (610) if the transmitted and local cryptograms are identical, and rejected (69) if they are not.

FIG. 9 also shows in greater detail step 92 in which the local cryptogram is calculated, divided into the following steps:

The SIM module reads (94), in the "System" field 5 of the enhanced message, information for locating a system file (EF SMS System);

From this, the SIM module deduces (95) the location, in the SIM module data storage means, of the system file (EF SMS System). This system file itself contains another piece of locating information enabling the SIM module to find the cryptographic function and its associated key, which are linked to the remote application sending the enhanced message;

The SIM module calculates (96) the local cryptogram, using the cryptographic function and its associated key, as explained above.

It should be noted that step 94 and the start of step 95 have actually been completed already, as explained before, to find the previous synchronization counter value (which is directly stored in the file system (EF SMS System)).

Clearly, numerous other embodiments of the invention could be envisaged.

In particular, two separate system fields could be provided, one to find the previous synchronization counter value and the other to find the cryptographic function and its associated key. In this case, one would have two "System" fields of the type with reference numeral 5.

The cryptographic function can also be of the public key type.

Finally, it should be noted that step 62 in which the checksum is verified and step 68 in which the transmitted cryptogram is verified could be omitted.

What is claimed is:

1. Enhanced message of the type transmitted by a message service center (C-SMS) to a mobile station (MS) of a cellular radio communication system, said enhanced message including a header (1) and a body (2), said body (2) containing in particular a first field (3) storing remote commands belonging to an application remote from said mobile station, said mobile station constituting a terminal cooperating with a subscriber identification module, said terminal including means for receiving said enhanced message, said subscriber identification module including means for storing and processing said enhanced message received by the terminal, said subscriber identification module serving to support said remote application and including means for executing said remote commands, said enhanced message being characterized in that said body (2) also includes a second field (4) for storing the current value of a synchronization counter, said current value of the synchronization counter being intended to be compared to a previous value of the synchronization counter stored in the subscriber identification module such that said enhanced message is accepted or rejected by the subscriber identification module depending on the result of comparing the current with the previous value of the synchronization counter, said previous value being updated with said current value only once the enhanced message has been accepted by the subscriber identification module.

2. Enhanced message according to claim 1, characterized in that body (2) of said enhanced message also includes a third field (5) storing a first piece of information pinpointing the location of said previous synchronization counter value in said subscriber identification module data storage means.

3. Enhanced message according to claim 2, wherein said subscriber identification module data storage means have a hierarchical structure with at least three levels including at least the following three types of files:

master file (MF);

dedicated file (DF) or dedicated file placed under said master file, elementary file (EF) placed under one of said dedicated files, known as parent dedicated file, or directly under said master file, known as parent master file, an elementary system file (EF SMS System) specific to each remote application containing a second piece of information pinpointing the location of said previous synchronization counter value in said subscriber identification module data storage means, said enhanced message being characterized in that said first piece of locating information contained in said third storage field (5) is an identifier of a dedicated file (DF) or master file (MF) to which said elementary system file (EF SMS System) relates according to a predetermined search strategy in the data storage means.

4. Enhanced message according to claim 1, characterized in that said body also includes a fourth field (6) storing a cryptogram, known as transmitted cryptogram, calculation of which at least partially involves the content of the second field storing the current synchronization counter value, said transmitted cryptogram being intended to be compared with another cryptogram, known as local cryptogram, calculated by the subscriber identification module so that said enhanced message is accepted by the subscriber identification module if the transmitted and local cryptograms are identical, and rejected if they are not.

5. Enhanced message according to claim 4, characterized in that calculation of said transmitted and verification cryptograms also involves, at least partially, the content of the first field (3) storing the remote commands.

6. Enhanced message according to claim 5, characterized in that calculation of said transmitted and local cryptograms involves at least the entire content of the second field (4) storing the current synchronization counter value and the entire content of the first field (3) storing the remote commands.

7. Enhanced message according to claim 1, characterized in that said transmitted and local cryptograms are calculated with a cryptographic function belonging to the group including:

the secret key cryptographic functions; and the public key cryptographic functions.

8. Enhanced message according to claim 1, whereby said subscriber identification module stores, in said subscriber identification module data storage means, a cryptographic function and an associated key which are specific to said remote application and enables said local cryptogram to be calculated, said enhanced message being characterized in that the body of said enhanced message also includes a fifth field (5) storing a third piece of information pinpointing the location in said data storage means where said cryptographic function and said associated key specific to said remote application are stored.

9. Enhanced message according to claim 1, characterized in that said third field (5) also constitutes said fifth field, and said first piece of locating information also constitutes said third piece of locating information.

10. Enhanced message according to claim 1, characterized in that said body (2) also includes a sixth field (7) storing a checksum, known as transmitted checksum, calculation of which involves, at least in part, the contents of the first field (3) storing remote commands, said transmitted checksum being intended for comparison with another checksum known as local checksum, calculated by the subscriber identification module, so that said enhanced message is accepted by the subscriber identification module if the transmitted checksum and local checksum are identical, and rejected if they are not.

11. Enhanced message according to claim 1, said subscriber identification module including an input/output line over which it receives local commands belonging to an application local to said mobile station, characterized in that said remote commands contained in said first field (3) of said enhanced message are substantially identical to said local commands received over the input/output line.

12. Method for synchronizing and ensuring security of enhanced messages exchanged between a message service center (C-SMS) and a mobile station (MS) of a cellular radio communication system, each enhanced message including a header (1) and a body (2), said body (2) containing in particular a first field (3) for storing remote commands belonging to a remote application of said mobile station, said mobile station constituting a terminal cooperating with a subscriber identification module, said terminal including means for receiving said enhanced message, said subscriber identification module including means for storing and processing said enhanced message received by the terminal, said subscriber identification module serving to support said remote application and including means for executing said remote commands, said method being characterized by having in particular the following steps:

said message service center transmits (61) to said mobile station an enhanced message whose body also includes a second field in which the current value of a synchronization counter is stored;

the subscriber identification module of the mobile station compares (65, 85) said current synchronization counter value contained in said enhanced message with a previous synchronization counter value stored in the subscriber identification module;

the subscriber identification module accepts (67) or rejects (66) said enhanced message depending on the result of comparing the current with the previous synchronization counter values;

if the enhanced message has been accepted, the subscriber identification module updates (86) said previous value with said current value.

13. Method according to claim 12, characterized in that, for each new enhanced message of said remote application transmitted by said message service center, the current synchronization counter value is incremented by a predetermined step, and in that said enhanced message is accepted by the subscriber identification module only if said current synchronization counter value is higher than said previous value.

14. Method according to claim 12, characterized in that said step in which the previous synchronization counter value is updated with said current value is carried out only if the difference between said current and previous values is less than a maximum predetermined increment.

15. Method according to claim 12, characterized by also including the following step:

when said enhanced message is rejected (66) by the subscriber identification module, the latter sends back (87) to the message service center an enhanced message containing a specific error code telling the message service center that said enhanced message that it previously transmitted was rejected due to a counter synchronization problem.

16. Method according to claim 12, characterized in that the body (2) of said enhanced message transmitted by the message service center to the mobile station also includes a third field (5) storing a first piece of information pinpointing the storage location, in said subscriber identification module data storage means, of said previous synchronization counter value, and in that said comparison step (85) by the subscriber identification module of the current and previous synchronization counter values is preceded by the following steps:

the subscriber identification module reads (82) said first piece of locating information contained in the third field of said enhanced message;

the subscriber identification module deduces (83) therefrom the storage location of the previous synchronization counter value;

the subscriber identification module reads (84), in said storage location, the previous synchronization counter value.

17. Method according to claim 12, characterized in that the body (2) of the enhanced message transmitted by the message service center to the mobile station also includes a fourth field (6) storing a cryptogram, known as transmitted cryptogram, calculated using at least part of the contents of the second field (4) storing the current synchronization counter value, and in that said method also includes the following steps:

the subscriber identification module calculates (92) a local cryptogram, using at least in part the contents of the second field (4) of said enhanced message;

the subscriber identification module compares (93) said transmitted cryptogram to said local cryptogram so that said enhanced message is accepted if the transmitted and local cryptograms are identical and rejected if they are not.

18. Method according to claim 12, whereby said subscriber identification module stores, in said subscriber identification module data storage means, a cryptographic function and an associated key that are specific to said remote application enabling said local cryptogram to be calculated, characterized in that the body of said enhanced message transmitted by the message service center to the mobile station also includes a fifth field (5) storing a third piece of information pinpointing the storage location, in said data storage means, of said cryptographic function and said associated key, and in that said step (92) in which the subscriber identification module calculates said local cryptogram is divided into the following steps:

the subscriber identification module reads (94) said third piece of locating information contained in the fifth field (5) of said enhanced message;

the subscriber identification module (95) deduces from this the storage location of said cryptographic function and said associated key;

the subscriber identification module calculates (96) said local cryptogram, using said cryptographic function, said associated key, and at least part of the contents of the second field (4) of said enhanced message.

19. Method according to claim 18, whereby said subscriber identification module data storage means possess a hierarchical structure with at least three levels having at least the following three types of files:

master file (MF);

dedicated file (DF), or dedicated file placed under said master file, elementary file (EF) placed under one of said dedicated files, known as parent dedicated file, or directly under said master file, known as parent master file, said method being characterized in that an elementary system file (EF SMS System) specific to each remote application, contains a second piece of information pinpointing the location, in said subscriber identification module data storage means, of said previous synchronization counter value, of said cryptographic function, and of said associated key, and in that said third field (5) also constitutes said fifth field with said first piece of locating information also constituting said third piece of locating information, and characterized in that said first piece of locating information contained in said third storage field (5) is an identifier of a dedicated file (DF) or master file (MF) to which said elementary system file (EF SMS System) relates according to a predetermined search strategy in the data storage means.

20. Method according to claim 12, characterized in that body (2) of said enhanced message transmitted by the message service center to the mobile station also includes a sixth field (7) storing a checksum, known as transmitted checksum, calculation of which involves at least in part the contents of the first field (3) storing remote commands, and in that said method also includes the following steps:

the subscriber identification module calculates (72) a local checksum, using at least in part the contents of the first field (3) of said enhanced message, the subscriber identification module compares (73) said transmitted checksum to said local checksum so that said enhanced message is accepted if the transmitted and local checksums are identical and rejected if they are not.

* * * * *